US009828939B2

(12) United States Patent
Boczek et al.

(10) Patent No.: US 9,828,939 B2
(45) Date of Patent: Nov. 28, 2017

(54) PISTON COMPRISING A PISTON HEAD COOLED BY SPLASH LUBRICATION

(71) Applicant: Mahle International GmbH, Stuttgart (DE)

(72) Inventors: Sascha-Oliver Boczek, Dielheim (DE); Klaus Keller, Lorch (DE)

(73) Assignee: Mahle International GmbH (DE)

( * ) Notice: Subject to any disclaimer, the term of this patent is extended or adjusted under 35 U.S.C. 154(b) by 74 days.

(21) Appl. No.: 14/780,148

(22) PCT Filed: Mar. 24, 2014

(86) PCT No.: PCT/EP2014/055807
§ 371 (c)(1),
(2) Date: Sep. 25, 2015

(87) PCT Pub. No.: WO2014/154616
PCT Pub. Date: Oct. 2, 2014

(65) Prior Publication Data
US 2016/0208733 A1 Jul. 21, 2016

(30) Foreign Application Priority Data

Mar. 26, 2013 (DE) .................. 10 2013 205 298

(51) Int. Cl.
*F02F 3/22* (2006.01)
*F16J 1/09* (2006.01)
(Continued)

(52) U.S. Cl.
CPC .............. *F02F 3/22* (2013.01); *F02F 3/0069* (2013.01); *F16J 1/09* (2013.01); *F16J 1/16* (2013.01); *F01P 3/08* (2013.01); *F16C 9/04* (2013.01)

(58) Field of Classification Search
CPC .......... F02F 3/22; F02F 3/0069; F02F 3/0084; F02F 3/0092; F02F 3/10; F16J 1/09;
(Continued)

(56) References Cited

U.S. PATENT DOCUMENTS 1,513,272 A * 10/1924 Pourroy ................ F02F 3/0092
403/150
2,108,194 A 2/1938 Church
(Continued)

FOREIGN PATENT DOCUMENTS

DE 1063862 B 8/1959
DE 79636 C 11/1971
(Continued)

OTHER PUBLICATIONS

English abstract for DE-102004029926.
English abstract for DE-4135237.

*Primary Examiner* — Carlos A Rivera
*Assistant Examiner* — Anthony Taylor, Jr.
(74) *Attorney, Agent, or Firm* — Fishman Stewart PLLC

(57) ABSTRACT

A piston of an internal combustion engine may include a piston head, a piston hub and a connecting rod having a joint end connected via an articulated connection to the piston hub. A reservoir may be provided and configured to receive splash oil for cooling the piston head. The reservoir may include at least one splash outlet directed towards the piston head. The reservoir may be arranged at the joint end of the connecting rod on a side facing towards the piston head.

20 Claims, 2 Drawing Sheets

(51) Int. Cl.
*F16J 1/16* (2006.01)
*F02F 3/00* (2006.01)
*F01P 3/08* (2006.01)
*F16C 9/04* (2006.01)

(58) Field of Classification Search
CPC ........ F16J 1/16; F01P 3/08; F16C 9/04; F16C 9/02; F16C 17/028
USPC ............................................ 123/41.35, 197.4
See application file for complete search history.

(56) References Cited

U.S. PATENT DOCUMENTS

| | | | | |
|---|---|---|---|---|
| 4,142,484 | A * | 3/1979 | Buhl | F02F 3/22 |
| | | | | 123/193.6 |
| 4,506,632 | A * | 3/1985 | Kanda | F01M 1/08 |
| | | | | 123/193.6 |
| 6,701,875 | B2 * | 3/2004 | Weng | F01P 3/08 |
| | | | | 123/193.6 |
| 8,136,502 | B2 * | 3/2012 | Gildemeister | F02F 3/22 |
| | | | | 123/193.6 |
| 8,146,560 | B2 | 4/2012 | Scharp et al. | |
| 8,161,934 | B2 | 4/2012 | Scharp et al. | |
| 8,267,005 | B2 * | 9/2012 | Scharp | B23P 15/10 |
| | | | | 92/186 |
| 2009/0250033 | A1 * | 10/2009 | Scharp | F02F 3/22 |
| | | | | 123/193.6 |

FOREIGN PATENT DOCUMENTS

| | | |
|---|---|---|
| DE | 2539470 A1 | 3/1977 |
| DE | 3423889 A1 | 2/1985 |
| DE | 4135237 A1 | 4/1993 |
| DE | 102004029926 A1 | 1/2006 |
| DE | 102008055911 A1 | 5/2010 |
| DE | 102009032865 A1 | 5/2010 |
| DE | 102009032916 A1 | 5/2010 |
| GB | 1097110 A | 12/1967 |
| GB | 1136833 A | 12/1968 |
| GB | 2261717 A | 5/1993 |

* cited by examiner

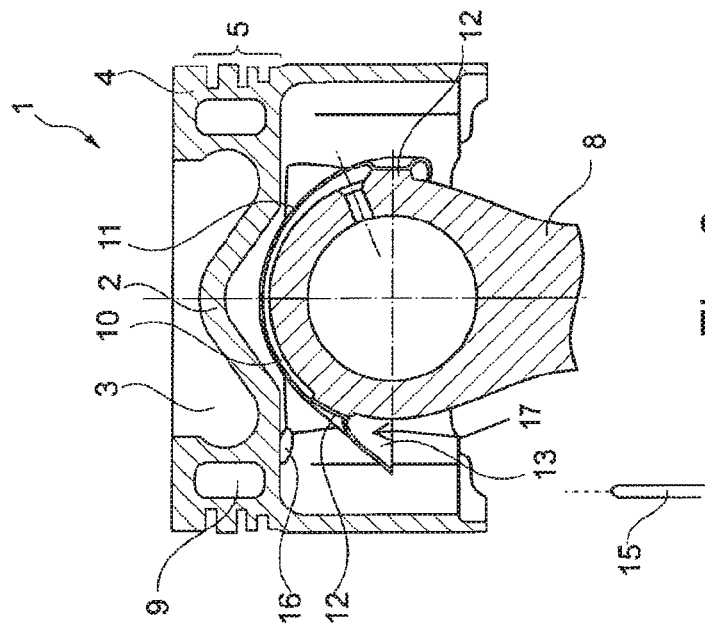
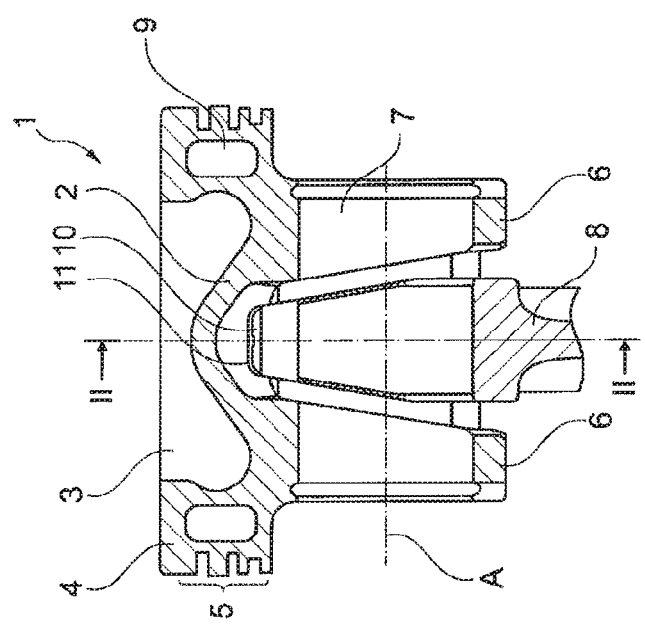

PISTON COMPRISING A PISTON HEAD COOLED BY SPLASH LUBRICATION

CROSS-REFERENCE TO RELATED APPLICATIONS

This application claims priority to German Patent Application No. 10 2013 205 298.7, filed Mar. 26, 2013, and International Patent Application No. PCT/EP2014/055807, filed Mar. 24, 2014, both of which are hereby incorporated by reference in their entirety.

TECHNICAL FIELD

The invention relates to a piston, in particular of an internal combustion engine, comprising a piston head cooled by splash oil.

BACKGROUND

In the case of internal combustion engines with a high power density, particular measures are necessary for cooling the pistons.

It is known in this connection to act upon the piston with cooling splash oil via splash nozzles arranged in the crank space of the internal combustion engine.

DE 25 39 470 A1 shows a piston of this type with an associated spray nozzle, wherein the ejected splash oil is splashed into the downwardly open piston interior, and therefore the lower side of the piston head, which side faces the piston interior, is constantly cooled. However, it is demonstrated in DE 25 39 470 A1 that splash cooling of this type is inadequate in the event of a higher power density of the engine. It is therefore proposed in DE 25 39 470 A1, at the lower end of the piston remote from the combustion chamber, to arrange an oil-connecting trough which annularly surrounds the connecting-rod passage, collects at least a portion of the oil splashed against the lower side of the piston head and, over the course of the movements of the piston, acts as a shaker space and holds the collected oil against the piston head again.

Although the cooling of the piston is therefore improved, a further intensification of the cooling nevertheless remains desirable. In particular, there is the difficulty in an arrangement as per DE 25 39 470 A1 that the splash jet of the splash nozzle arranged outside the movement space of the connecting rod first of all impinges against an eccentric region of the piston head, and therefore the piston head is inevitably cooled non-uniformly.

DE 10 2008 055 911 A1 shows pistons which are highly loadable thermally and have an outer annular cooling duct in the vicinity of the fire land forming the combustion-chamber-side edge of the piston head and in the vicinity of the piston ring portion of the piston. Cooling oil can be sprayed into said outer cooling duct in order effectively to cool the thermally extremely highly loaded fire land and the piston ring portion. In order to empty the cooling duct, radial ducts are provided on the inner circumference of the latter, via which radial ducts the annular outer cooling duct communicates with a cavity arranged below the central region of the piston head. Said cavity acts in the manner of a shaker space, and therefore, during the reciprocating movements of the piston, the oil accommodated in the cavity is continuously thrown against the lower side of the piston head. The oil is ejected from the cavity through openings in the direction of the articulated connection between piston and connecting rod, and therefore an intensive lubrication of said joint can additionally be ensured.

Similar pistons are depicted in DE 10 2009 032 916 A1 and DE 10 2009 032 865 A1.

However, it has to be accepted in the case of pistons of this type that the oil serving for cooling the piston head has previously already absorbed large amounts of heat within the outer cooling duct and has accordingly reached a comparatively high temperature.

SUMMARY

In principle, it therefore remains desirable to demonstrate improved or at least novel measures or designs for cooling pistons.

According to the invention, this object is achieved in the case of a piston of the type indicated at the beginning in that a reservoir initially accommodating splash oil and having splash outlets directed toward the piston head is arranged on a connecting rod which is connected in an articulated manner to the piston.

The invention is based on the general concept of acting upon the piston head with cooling oil from a connecting-rod-side shaker space which ensures effective and uniform cooling of the piston head.

Since, according to a preferred embodiment of the invention, said shaker space can readily be arranged on a connecting-rod end side closely adjacent to the piston head and virtually any specifications are possible for the arrangement of the splash openings, particularly effective cooling of the piston head with very substantially central action thereupon with cooling oil can be achieved by the invention.

There are in principle various possibilities for supplying the oil to the reservoir.

Firstly, it is possible to conduct the oil to the reservoir via ducts in the connecting rod and in a crankshaft connected in terms of drive to the latter, wherein the articulated connections between crankshaft and connecting rod and between connecting rod and piston can thereby be lubricated at the same time. Since the splash oil provided for cooling the piston head is held out of the reservoir via the splash outlets over the course of the piston strokes because of the shaking movements executed by said reservoir, in this arrangement the operation can be carried out with comparatively little supply pressure for the oil in the abovementioned ducts, that is to say, the supply pressure merely has to be sufficient in order to direct sufficient amounts of oil to the reservoir, whereas the supply pressure does not need to suffice to produce effective splash jets at the splash outlets.

Instead of the abovementioned lines in the crankshaft and in the connecting rod, it can be provided, according to a particularly preferred embodiment, to spray splash oil during the piston strokes into a, for example, funnel-like inlet opening of the reservoir by means of a nozzle arranged relatively stationarily.

According to an embodiment of the invention expedient for simple production, the reservoir can be designed as a half-pipe-shaped shell part which is arranged on an end surface region of the connecting rod, which end surface region faces the piston head to be cooled, wherein the open half-pipe side of the shell part can be arranged on the connecting-rod side and the longitudinal axis of the half-pipe-shaped shell part can form a U bow centered with respect to the axis of the connecting joint of connecting rod and piston.

Said shell part can be designed, for example, as a sheet metal part. Instead, a plastics shell part is also possible because the thermal loading of the reservoir remains small.

Furthermore, with regard to preferred features of the invention, reference is made to the claims and the explanation below of the drawing, with reference to which particularly preferred embodiments of the invention are described in more detail.

BRIEF DESCRIPTION OF THE DRAWINGS

In the drawing:

FIG. 1 shows an axial section of a piston with an assigned connecting rod, wherein the section plane contains the axis of the connecting joint between connecting rod and piston, FIG. 2 shows an axial section of said piston corresponding to the section line II-II in FIG. 1.

DETAILED DESCRIPTION

Figure 3:
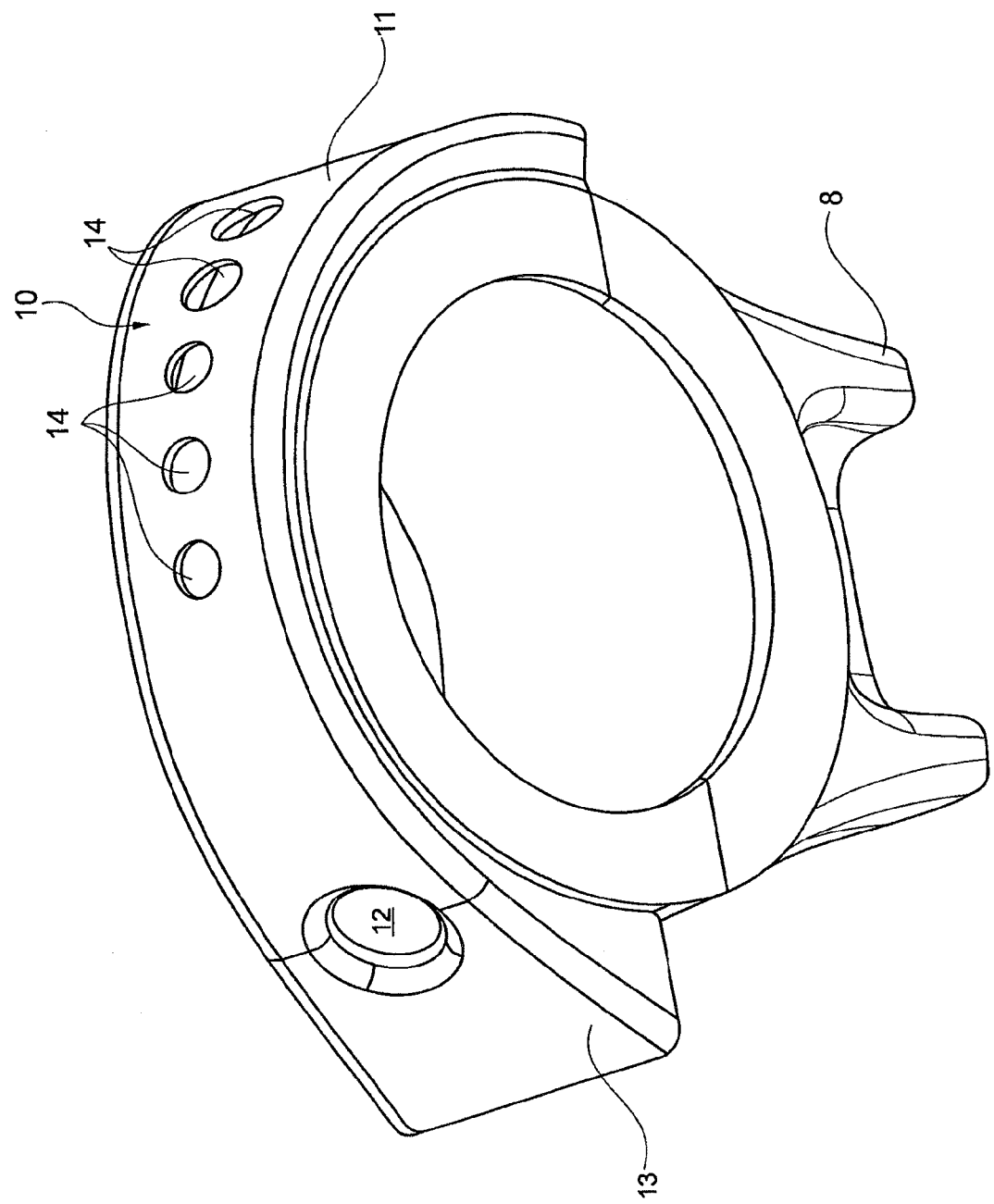
FIG. 3 shows a perspective view of the piston-side end of the connecting rod.

According to FIGS. 1 and 2, the piston 1 according to the invention has a piston head 2 with a combustion recess 3. The piston head is bounded on the circumferential side by an encircling fire land 4 which is adjoined in the axial downward direction of the piston by an encircling ring portion 5 with circumferential grooves for receiving piston rings (not illustrated). Piston hubs 6 with hub bores 7 for receiving a piston pin (not illustrated) are arranged below the piston head 2.

The piston-side end of a connecting rod 8 is arranged axially between the piston hubs 6, with the piston pin (not illustrated) passing through the piston-side joint eye of said connecting rod and through the piston hubs 6.

During operation, the piston 1 is thermally heavily loaded. An encircling cooling duct 9 into which oil for cooling is sprayed in a manner illustrated further below during operation of the engine is therefore provided radially within the fire land 4. In addition, during the operation of the engine, the lower side of the piston head 2 is acted upon with cooling splash oil. Alternatively, the present invention could also be used on a piston cooled only by splash cooling.

For this purpose, an oil reservoir 10 which can be formed, for example, by a half-pipe-shaped sheet metal shell 11 is arranged on that side of the piston-side end of the connecting rod 8 which faces the piston head 2. Said sheet metal shell 11 has a curved longitudinal axis in such a manner that the shell 11 forms a U bend, which is centered with respect to the axis A of the piston pin (not illustrated), and can very substantially tightly adjoin the outer side of the piston-side end of the connecting rod 8, which outer side faces the piston head 2. In order to fasten the sheet metal shell 11 to the connecting rod 8, humps 12 which protrude inward toward the connecting rod 8 are impressed into the sheet metal shell 11. The humps 12 are designed to bear against the outer side of the connecting rod 8, wherein the height of the humps 12 with respect to the sheet metal shell 11 determines the distance of the sheet metal shell 11 from the connecting rod 8. The bearing surfaces of the humps 12, which bearing surfaces are arranged on the inner side of the sheet metal shell 11, can be spot-welded to the connecting rod.

At one longitudinal end, the sheet metal shell 11 is designed as a funnel-like mouth 13 while the other longitudinal end of the sheet metal shell 11 is closed. In addition, one or preferably more splash holes 14 are provided on that side of the sheet metal shell 11 which faces the piston head 2. The oil reservoir 10 formed by the sheet metal shell 11 interacts with a splash nozzle 15 which is arranged in a stationary manner in the crank space (not illustrated) of an internal combustion engine and, during a predetermined phase of the operating cycle of the piston 1, sprays oil into the mouth 13 of the sheet metal shell 11 and therefore into the oil reservoir 10. When the piston 1 then runs through the upper dead center thereof during the operating cycle and very high accelerations occur because of the change in direction of the piston movement, the oil previously accommodated in the oil reservoir 10 is held out of the splash holes 14 on to the facing lower side of the piston head 2. The oil reservoir 10 here forms a shaker space, the shaking movements of which are used for ejecting the oil.

In a preferred embodiment, some, and preferably all of the splash holes are arranged with respect to the connecting-rod zenith on that side of the shell part 11 which faces away from the inlet opening 17, as viewed in a circumferential direction about the axis of articulation of the connecting rod 8. Alternatively or additionally, the size of two or more splash openings 14 in the shell part 11 along a U-shaped longitudinal axis can increase at an increasing distance from the inlet opening 17. For this purpose, the shell part 11 has at least one first and one second splash opening 14, wherein the second is larger than the first and is further away than the first from the inlet opening 17.

By means of the two measures, the majority of the oil is ejected via the splash openings 14 precisely where the oil is most urgently needed for cooling, namely on that side of the connecting rod which faces away from the splash jet. The cooling of that part of the piston head 2 which faces away from the splash nozzle 15 is thus improved in a targeted manner. Since, during pure splash cooling, the remote regions always obtain less cooling oil at an increasing distance from the splash jet, the two measures contribute to a more uniform cooling of the piston head 2. The cooling oil is consequently guided in the reservoir 10 around the connecting-rod head and is then released particularly at the point at which the cooling of the piston head solely by splashing would be the weakest. Insufficiently cooled and therefore excessively hot regions in which impinging oil may change into coke and form undesirable carbon can thus be avoided.

Over the course of the operating cycle of the piston 1, the connecting rod 8 executes pivoting movements relative to the piston 1, said pivoting movements leading to a tumbling movement of the mouth 13, with the distance from the splash nozzle 15 being changed at the same time. Said tumbling movements and changes in distance can serve for controlling the splash jet produced by the nozzle 15. For this purpose, the splash jet or the splash nozzle 15 and the mouth 13 can be aligned with respect to each other in such a manner that the splash jet is directed into the mouth 13 only during a first phase of the operating cycle of the piston, whereas said splash jet misses the mouth 13 in a subsequent or preceding second phase and either directly splashes the piston head 2 or preferably penetrates into a piston-side opening 16 which communicates with the annular cooling duct 9 such that the latter is supplied with cooling oil which can subsequently run out again via the opening 16 or another opening (not illustrated). In this manner, the oil reservoir 10 according to the invention can be filled and alternatively conventional splash or duct cooling can be brought about using a single oil nozzle 15.

However, according to a further embodiment of the invention, it is also possible to assign two splash nozzles to each piston in the crank space of the engine, with one splash nozzle serving to fill the oil reservoir 10 and the other splash nozzle serving to splash the piston head 2 or to introduce oil into the opening 16 or into the cooling duct 9.

Depending on the direction of rotation of the crankshaft connected in terms of drive to the piston 1 via the connecting rod 8, the mouth 13 of the oil reservoir 10 executes tumbling movements relative to the splash nozzle 15 in mutually opposite directions, wherein the mouth 13 can move in the direction of the splash jet or counter to the splash direction. In the former case, a relatively laminar flow can be obtained during the filling of the reservoir 10 while, in the other case, the reservoir 10 can be filled comparatively rapidly.

Instead of a sheet metal shell 11, a shell part composed of another material, for example plastic or the like, can also be provided, wherein even materials which are not highly thermally loadable are possible because the shell part 11 is at a sufficient distance from the thermally highly loaded piston head 2. However, in all of the configurations, the shell part 11 should be relatively flat such that it is possible for there to be relatively small distance between piston head and axis of articulation of the joint connection piston 1 and connecting rod 8 and accordingly a small compression height of the piston.

The invention is not limited to the piston shapes illustrated in FIGS. 1 and 2. On the contrary, the splash cooling according to the invention of the piston heads is possible and advantageous in the case of any piston shapes, for example even in the case of pistons with piston heads which are convexly spherical in the combustion-chamber side.

The invention claimed is:

1. A piston of an internal combustion engine, comprising:
   a piston head and a piston hub having a hub bore defining an axis;
   a connecting rod including a joint end arranged coaxially to the axis of the hub bore and connected via an articulated connection to the piston hub, wherein the joint end of the connecting rod includes a first portion and a second portion disposed away from the piston head in relation to the first portion, the first portion having an outer side facing towards the piston head;
   a reservoir disposed between the piston head and the joint end of the connecting rod and including an inlet opening to receive splash oil for cooling the piston head, the reservoir further including a shell arranged on the first portion of the joint end and extending circumferentially to the axis along the outer side of the first portion, the shell including at least one splash opening directed towards the piston head, wherein the shell is arranged between the outer side of the joint end and an underside of the piston head facing towards the connecting rod, and wherein the inlet opening is disposed at a circumferential end of the shell between the piston head and the joint end of the connecting rod.

2. The piston as claimed in claim 1, wherein the reservoir is suppliable with splash oil via a supply line arranged in the connecting rod.

3. The piston as claimed in claim 1, wherein the inlet opening is configured to receive splash oil via a separately arranged nozzle during an operating cycle of the piston.

4. The piston as claimed in claim 3, wherein the separately arranged nozzle and the inlet opening are arranged with respect to each other so that a splash jet communicated from the separately arranged nozzle is directed into the inlet opening during a first phase of the operating cycle and the splash jet misses the inlet opening during a second phase of the operating cycle.

5. The piston as claimed in claim 1, wherein the shell of the reservoir is configured as a half-pipe-shaped shell part, the shell part including an open half-pipe side disposed at the circumferential end in a region of the inlet opening and a closed half-pipe side facing towards the piston head, and wherein the closed half-pipe side includes the at least one splash opening.

6. The piston as claimed in claim 5, wherein the shell part has a U-shaped longitudinal axis disposed substantially centered with respect to the axis of the hub bore.

7. The piston as claimed in claim 6, wherein the at least one splash opening of the shell part is a first splash opening, and further including a second splash opening, wherein the second splash opening is larger than the first splash opening and the second splash opening is disposed further away from the inlet opening than the first splash opening.

8. The piston as claimed in claim 5, wherein the at least one splash opening is arranged with respect to a connecting-rod zenith on a side of the shell part facing away from the inlet opening.

9. The piston as claimed in claim 5, wherein the shell part includes one end configured as a funnel shaped mouth and another end configured closed.

10. The piston as claimed in claim 5, wherein the shell part is configured as a sheet metal part.

11. The piston as claimed in claim 5, wherein the shell part is configured as a plastic part.

12. The piston as claimed in claim 4, wherein the piston head includes a cooling duct inlet opening communicating with a cooling duct, and wherein the splash jet is at least temporarily directed to the cooling duct inlet opening of the cooling duct in response to missing the inlet opening of the reservoir.

13. The piston as claimed in claim 1, wherein the shell is coupled to the first portion of the joint end via at least one hump protruding inwardly from the shell and bearing against the outer side of the joint end, and wherein a space for accommodating splash oil is defined between the shell and the outer side of the joint end.

14. The piston as claimed in claim 1, wherein the shell includes an open side disposed at the circumferential end in a region of the inlet opening and a closed side arranged at the joint end of the connecting rod facing towards the piston head, and wherein the shell includes a plurality of splash openings.

15. A piston of an internal combustion engine, comprising:
    a piston head and a piston hub having a hub bore, the piston head and the piston hub together defining an axis;
    a connecting rod having a joint end coupled via an articulated connection to the piston hub, wherein the joint end includes a first portion and a second portion disposed away from the piston head in relation to the first portion;
    a reservoir arranged at the first portion of the joint end between the connecting rod and the piston head, wherein the reservoir is configured as a shell part including a mouth, a closed end circumferentially spaced from the mouth and a plurality of splash openings arranged between the mouth and the closed end, and wherein the mouth defines an inlet opening for receiving splash oil for cooling the piston head.

16. The piston as claimed in claim 15, wherein the shell part extends along a curved longitudinal axis between the mouth and the closed end, and wherein the plurality of splash openings are arranged along the longitudinal axis of the shell part.

17. The piston as claimed in claim 15, wherein the plurality of splash openings are directed towards the piston head and include at least two splashing openings having a dissimilar size from one another.

18. A piston and connecting rod assembly for an internal combustion engine, comprising:
   a piston head and a piston hub having a hub bore defining an axis;
   a connecting rod including a joint end arranged coaxially to the axis of the hub bore and connected via an articulated connection to the piston hub, wherein the joint end of the connecting rod includes a first portion and a second portion disposed away from the piston head in relation to the first portion, the first portion having an outer side facing towards the piston head;
   a reservoir disposed at the joint end of the connecting rod and including an inlet opening to receive splash oil for cooling the piston head, the reservoir further including a shell part arranged between the first portion of the joint end and the piston head, the shell part extending circumferentially to the axis along the outer side of the first portion, wherein the shell part includes at least two splash openings directed towards the piston head; and
   wherein the at least two splash openings include a first splash opening and a second splash opening larger than the first splash opening.

19. The piston and connecting rod assembly as claimed in claim 18, wherein the second splash opening is disposed further away from the inlet opening than the first splash opening.

20. The piston and connecting rod assembly as claimed in claim 18, wherein the shell part extends along a curved longitudinal axis and includes a mouth at one longitudinal end and a closed end at another longitudinal end, and wherein the mouth defines the inlet opening.

\* \* \* \* \*